(No Model.)
L. A. GORMLEY.
VEHICLE SPRING.
No. 302,838. Patented July 29, 1884.
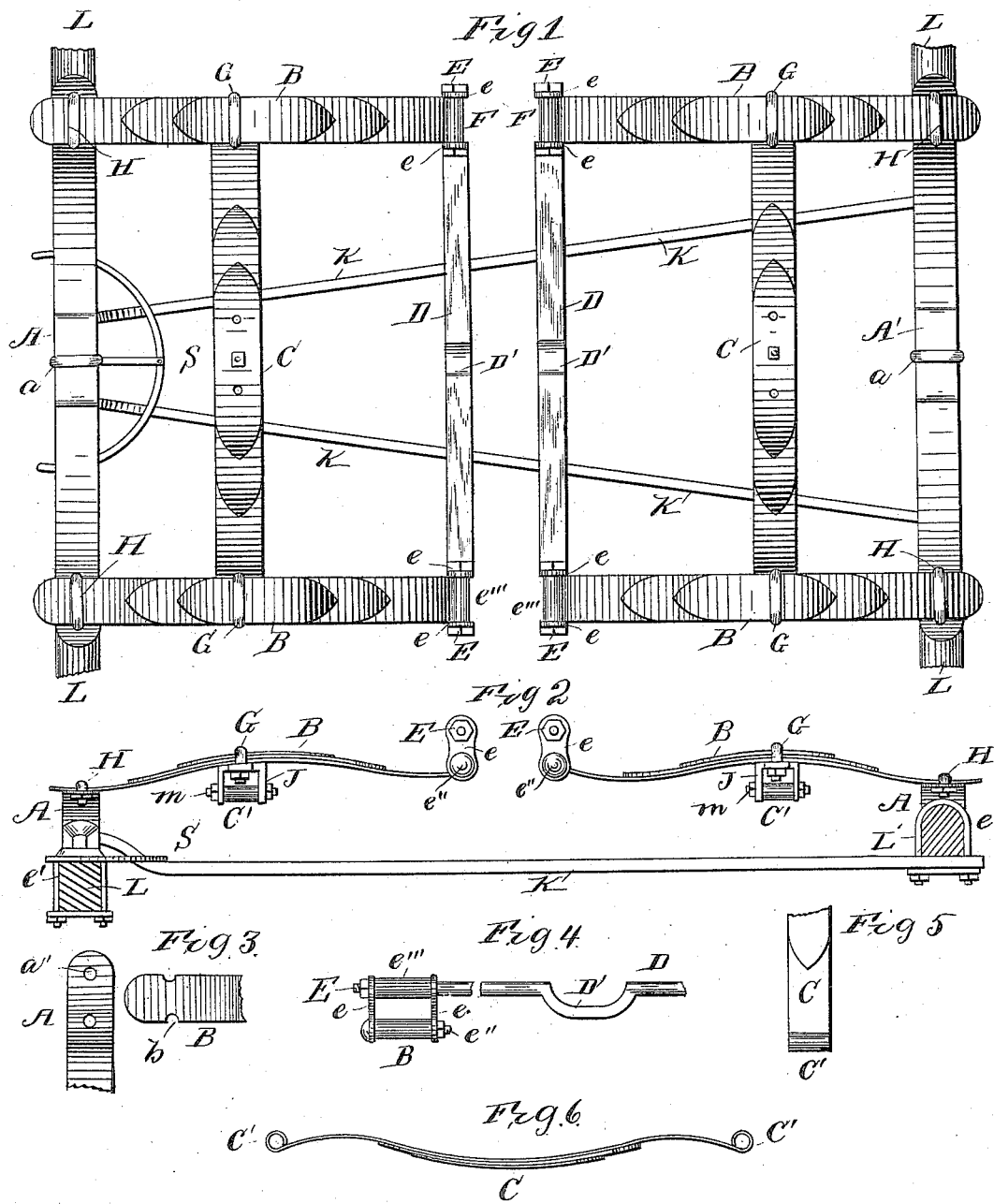
WITNESSES
Leander A. Gormley INVENTOR
W. J. Fitzgerald Attorney

UNITED STATES PATENT OFFICE.

LEANDER A. GORMLEY, OF CRAWFORD, OHIO.

VEHICLE-SPRING.

SPECIFICATION forming part of Letters Patent No. 302,838, dated July 29, 1884.

Application filed December 11, 1883. (No model.)

*To all whom it may concern:*

Be it known that I, LEANDER A. GORMLEY, a citizen of the United States, residing at Crawford, in the county of Wyandot and State of Ohio, have invented certain new and useful Improvements in Combination Vehicle-Springs; and I do hereby declare the following to be a full, clear, and exact description of the invention, such as will enable others skilled in the art to which it appertains to make and use the same.

The object of this improvement is, first, an equal distribution of the load-strain through all the springs forming the combination of springs, and thus cause each spring to distinctly assist in supporting the load; secondly, to prevent the backward, forward, and side swing motion so detrimental to vehicles of this class; thirdly, to secure a continuously level position to the body of the vehicle, and thereby secure greater comfort in the use of the same; and, fourthly, to obtain strong, light, neat, and graceful construction, involving greater load-capacity and durability than that pertaining to vehicles of this class in present general use. These results are obtained by the construction illustrated in the drawings herewith filed as part hereof, in which similar letters of reference denote corresponding parts.

Figure 1 is a plan view. Fig. 2 is a side elevation, partly in section. Fig. 3 is a view of end sections of the side and end springs, showing the means of connecting them at their outer ends. Fig. 4 is a sectional elevation of the cross-bar connecting the inward ends of the side springs. Fig. 5 is a section representing the end of the inner cross-spring. Fig. 6 is a side elevation of the inside cross-spring.

Referring to Fig. 1, A represents the lower cross-spring at the front part of the vehicle, and A' is the lower cross-spring at the rear thereof.

B represents the side springs; C, the inside cross-springs.

D represents the cross-bars provided with wrists E at both ends. The wrists E are provided with ferrules $e'''$, for keeping in proper positions the swinging plates $e$, attached to cross-bar wrists E, and carrying bolts $e''$, thus forming swinging stirrups to which the inner ends of the side springs, B, are connected by means of eyes in the corresponding ends thereof, similar to the eyes in the ends of the upper cross-springs, as more fully illustrated in Fig. 6. The lower cross-springs, A and A', are attached to the axle-trees L in the usual manner by means of the clips $a$. The side springs, B, are attached to the front and rear cross-springs, A and A', by means of ordinary clips, H, engaging with the notches $b$ in springs B, and eyes $a'$ in cross-springs A and A', being permanently fastened by the usual burr. The notches $b$ and eyes $a'$ in the side and end springs are specially illustrated in Fig. 3.

To the side cross-springs, B, are rigidly attached, by means of the clips G, the stirrups J, which are provided with transverse bolts $m$, to which the cross-springs C are swung by means of eyes $c'$ at the ends thereof, as illustrated in Fig. 6.

K K represent the coupling-bars connecting the axle-trees L, to which they are attached by means of ordinary clips, $l'$.

S indicates the usual fifth-wheel pertaining to vehicles of this class. The body of the vehicle is attached in the usual manner to the cross-springs C, by which it is primarily supported. It also rests upon the cross-bars D, which assist in dividing the load-strain upon the springs forming the combination.

Because of the peculiar connection of the cross-springs A and A' with the side springs, B, and the connection of the cross-springs C with the side springs, B, by means of the rigid stirrups J, and the inward end connection of the side springs, B, by means of the cross-bars D, there cannot be any motion of any spring in the combination independently of the others. They must all move simultaneously, if at all, and therefore the result or operation of this construction is to obviate the side-swing motion common to and inseparable from the mode of attaching cross-springs to side springs by means of swinging stirrups. The vehicle is supported in a continuously-level position, and the load-pressure is equally distributed among all the springs, thus enabling a light, neat, and graceful construction.

Having thus explained the construction and operation of my improvement, what I claim as new, and desire to secure by Letters Patent, is as follows:

In a combination vehicle-spring, the cross-bars D, provided with swinging stirrups E, constructed as shown, in combination with the side springs, B, provided with the rigid stirrups J, and the inner and outer cross-springs, A C and A' C', in a manner to operate substantially as specified, for the purpose set forth.

In testimony whereof I have affixed my signature in presence of two witnesses.

LEANDER A. GORMLEY.

Witnesses:
J. M. GORMLEY,
G. W. BARRUS.